United States Patent [19]
Byron

[11] Patent Number: 5,742,714
[45] Date of Patent: Apr. 21, 1998

[54] OPTICAL FM TO AM CONVERSION

[75] Inventor: Kevin Christopher Byron, Bishop's Stortford, United Kingdom

[73] Assignee: Northern Telecom Limited, Montreal, Canada

[21] Appl. No.: 753,845

[22] Filed: Dec. 2, 1996

[51] Int. Cl.[6] ................................................. G02B 6/26
[52] U.S. Cl. ...................... 385/27; 385/37; 385/31; 385/24
[58] Field of Search ........................... 385/27, 31, 37, 385/39, 20, 21, 24, 18, 22, 25, 130, 131, 129, 147; 359/130

[56] References Cited

U.S. PATENT DOCUMENTS

| | | | |
|---|---|---|---|
| 5,647,037 | 7/1997 | Byron | 385/27 |
| 5,657,406 | 8/1997 | Ball | 385/24 |

*Primary Examiner*—Phan T. H. Palmer
*Attorney, Agent, or Firm*—John D. Crane

[57] ABSTRACT

Optical FM is converted to AM, for instance for injection laser emission wavelength stabilisation, using an optical arrangement comprising a 2×2 3 dB coupler and a pair of monotonically oppositely chirped Bragg fiber grating spectrally selective reflectors connected in Mach Zehnder configuration.

8 Claims, 2 Drawing Sheets

OPTICAL FM TO AM CONVERSION

BACKGROUND OF THE INVENTION

U.S. Pat. No. 4,561,119 discloses using a Michelson interferometer to convert the FM output of a laser to AM. The classical form of a Michelson comprises a 3 dB beam splitter and a pair of mirrors, and the light is propagating in free-space in the two arms of the interferometer. A Michelson can also be constructed in an optical waveguide format which, for many optical communications applications, is more convenient than a free-space format. Such a Michelson can be constructed from a 3 dB 2×2 single mode optical fiber coupler, providing each fiber of the coupler with a reflecting end. The lengths of fiber between these two reflecting ends and the coupling region of the coupler constitute the two limbs of the interferometer.

In a Michelson, the characteristic that relates frequency of the light with the optical transmission of the device takes the form of a raised cosine whose plane and pitch is determined by the difference in optical path distance between the two interferometer arms. If these arms extend in free-space from the beam-splitter to each of the two mirrors, then, provided physical lengths of these two arms do not change, the transmission at any particular frequency exhibited by the Michelson exhibits no temperature dependence. On the other hand, if the arms are constituted by waveguides, the effective refractive index of such guides is liable to show a temperature dependence due to temperature dependent changes in polarisability of the materials of which the guide is composed, and additionally the lengths of the arms will be temperature dependent as the result of thermal expansion. The result is that the transmission at any particular frequency exhibited by a Michelson constructed in optical waveguide is liable to exhibit a small but not negligible temperature dependence. The magnitude of the effect depends upon the magnitude of the difference in optical path length between the two arms of the interferometer, and this in its turn depends upon the magnitude of the spectral resolution required of the Michelson.

SUMMARY OF THE INVENTION

The present invention is directed towards a way of obtaining a reduced temperature sensitivity for a Michelson constructed in an optical waveguide format.

According to the present invention there is provided a method of converting an FM signal propagating in an optical waveguide to an AM signal by dividing it into two substantially equal amplitude portions guided in physically separated waveguides, reflecting said portions respectively in positively and negatively monotonically chirped Bragg gratings, and recombining said portions after said reflection, the Bragg gratings being disposed such that, at a specific wavelength of the FM signal, the effective optical path distance travelled by each component from the physical separation of the components to their recombination is the same for both components.

The invention also provides an FM to AM converter comprising a 3 dB 2×2 optical waveguide splitter/combiner having first and second ports optically coupled with third and fourth ports via an optical coupling region, wherein the third and fourth ports are optically coupled with first and second spectrally selective reflectors respectively constituted by positively and negatively monotonically chirped Bragg gratings positioned such that light of a specific wavelength is reflected by the first and second gratings at equal effective path distances from the coupling region.

A particular application of the converter is in a feedback loop employed in the stabilisation of the emission wavelength of an injection laser.

Accordingly the invention further provides a method of stabilising the emission wavelength of an injection laser using a feedback control loop in which a portion of the laser emission is directed to a photodetector after having been divided into two substantially equal amplitude components that are recombined after reflection in oppositely directed positively and negatively chirped Bragg gratings formed in two waveguides and disposed such that, at a wavelength within the emission waveband of the laser, the optical path distances travelled by each component from their division to their recombination is the same for both components.

Additionally, the invention provides n emission wavelength stabilised injection laser provided with an emission wavelength stabilising feedback control loop in which a photodetector is optically coupled with the laser via an optical waveguide format Michelson interferometer constituted by a 2×2 3 dB beam splitter/combiner and two oppositely directed chirped Bragg grating wavelength selective reflectors disposed such that at a wavelength within the emission band of the laser the two interference arms of the Michelson interferometer have equal effective optical path lengths.

BRIEF DESCRIPTION OF THE DRAWINGS

There follows a description of a Michelson FM to AM converter embodying the invention in a preferred form, and of its use in stabilisation of the emission wavelengths of an injection laser. The description refers to the accompanying drawings in which.

BRIEF DESCRIPTION OF PREFERRED EMBODIMENTS

Figure 1:
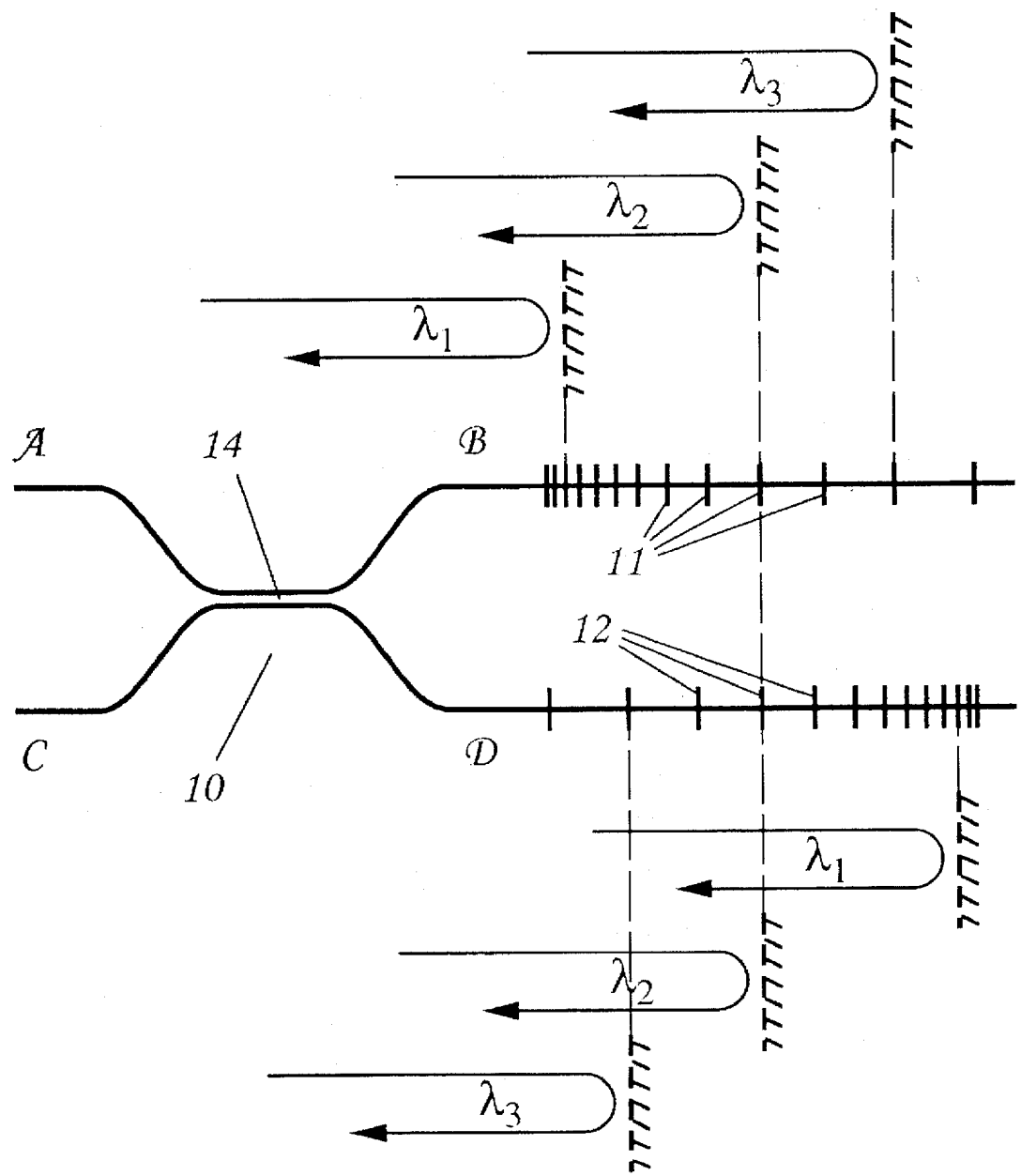
FIG. 1 schematically depicts the FM to AM converter.

Referring to FIG. 1, an FM to AM converter comprises a 3 dB 2×2 single mode optical fiber coupler 10 and two montonically chirped Bragg grating spectrally selective optical waveguide reflectors 11 and 12. The coupler 10 has ports A and C on one side of its coupling region 14, and ports B and D on the other. The two chirped Bragg reflectors are coupled respectively with ports B and D with orientations providing positive chirp for one reflector and negative chirp for the other. The two reflectors 11 and 12 may be identical, but this is not necessary. What is necessary is that the distances of the reflectors from the coupling region shall be such that there shall exist a wavelength $\lambda_2$ that both reflectors reflect at the same effective optical path distance from the coupling region 14.

This means that, at wavelength $\lambda_2$, the converter is functioning as a Michelson interferometer with interference arms of matched length. At any wavelength $\lambda_1$ on the short wavelength side of $\lambda_2$, the arms are mismatched in length, while at any wavelength $\lambda_3$ on the long wavelength side of $\lambda_2$, the arms are also mismatched, but the mismatch is in the opposite sense.

The reflectors 11 and 12 have been referred to as optically coupled with ports B and D of the coupler 10, but physically it may generally be found more convenient actually to employ an integrated structure in which the gratings that go to make the reflectors are created in the two fibers that constitute the coupler.

At the wavelength $\lambda_2$ the two arms of the Michelson are of equal effective length, and so changes in effect length occasioned by changes in temperature should apply equally to both arms. Unfortunately this does not eliminate all temperature sensitivity of the converter at this wavelength because there still remains the change in effective periodicity of the gratings produced by the temperature change. However this periodicity derived temperature sensitivity is smaller than the corresponding temperature sensitivity of a Michelson in which the place of the chirped reflectors is taken by total reflectors and in which a comparable spectral resolution is obtained by the choice of appropriate difference in optical path length between the two interference arms.

Figure 2:
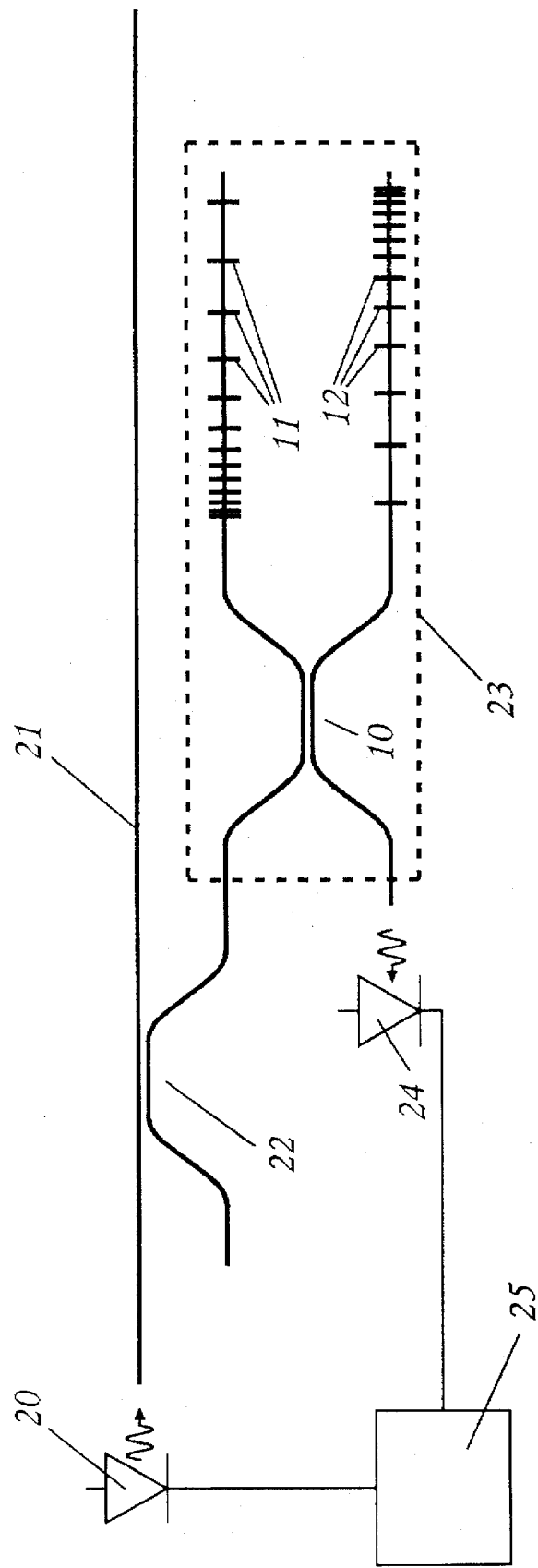
FIG. 2 schematically depicts a wavelength stabilised injection laser provided with a feedback control loop incorporating the converter of FIG. 1.

A particular application for the converter of FIG. 1 is as a component acting as a discriminator in a feedback control loop controlling the emission wavelength of an injection laser. Such an emission wavelength controlled laser is depicted in FIG. 2. The output of an injection laser 20 is coupled into an optical waveguide 21 from which a small portion of optical power is abstracted by way of a fiber coupler 22 and fed to an FM to AM converter 23 as described above with reference to FIG. 1 and comprising a coupler 10 and chirped Bragg reflectors 11 and 12. This output of the converter 23 is fed to a detector 24, which in its turn provides a feedback control signal applied to a laser driver 25 which regulates the emission wavelength of the laser 20, for instance by control of its temperature or control of its mean drive current.

When the emission wavelength of the laser 20 is at $\lambda_2$, the output of the converter 23 is at a maximum. The feedback loop can be arranged to stabilise at this wavelength by applying a small frequency modulation to the emission of the laser, and then using appropriate phase detection techniques in the feedback loop. Having regard to the temperature effects discussed with respect to FIG. 1, it is seen that this will make the stabilisation nearly, but not quite, independent of the temperature of the converter 23. An alternative to stabilising at a wavelength of peak transmisivity of the converter 23, is to stabilise instead at a wavelength corresponding to a point intermediate a peak and an adjacent trough in the transmisivity characteristic of the converter 23. This has the advantage of making it unnecessary to modulate the emission wavelength of the laser because the effects of small wavelength deviations are polarity sensitive. Moreover, though working on one side of the wavelength $\lambda_2$ will have the effect of adding a temperature sensitive component attributable to the difference in optical path length of the two interferometer arms to the already existing temperature sensitive effect attributable to the dilation of the effective grating pitch, working on the other side of the wavelength $\lambda_2$ will have the effect of offsetting the one effect against the other, thereby resulting in a closer approach to insensitivity of operation to changes in temperature of the converter.

The phase difference, $\phi$, between the light entering the coupling region 14 after reflection in Bragg reflector 11 and that entering it after reflection in Bragg reflector 12 is given by:

$$\phi = \frac{2\pi \cdot d \cdot n_{eff}}{\lambda}$$

where d is the physical difference in distance (from the coupling region) between the effective reflection points for light of wavelength $\lambda$, and $n_{eff}$ is the effective refractive index of the waveguides in which the reflectors are formed.

Rearranging and differentiating with respect to $\lambda$ yields:

$$d = \frac{\lambda^2}{2\pi \cdot n_{eff}} \cdot \frac{d\phi}{d\lambda}$$

The sort of magnitude of chirp required for wavelength stabilisation can be derived by inserting some illustrative values of typical parameters. For this purpose it will be assumed that feedback stabilisation is effective if, when the emission wavelength of the laser 20 drifts from an optimum value of 1.5 µm by 0.05 nm, the signal amplitude received by the detector 24 shall have dropped by 3 dB. It will also be assumed that $n_{eff}=1.44$ and that the Bragg reflectors are each 20 mm long. Under these conditions $$d = -\frac{1.5 \times 1.5 \times 10^{-12}}{2\pi \times 1.44 \times 1.44 \times 0.05 \times 10^{-9}} \cdot \frac{\pi}{2} \approx -7.8 \text{ mm}$$

This is in respect of both gratings, and so the chirp rate for each grating is therefore $$\frac{0.05}{3.9} \approx 12 \times 10^{-3} \text{ nm/mm.}$$

I claim:

1. A method of converting an FM signal propagating in an optical waveguide to an AM signal by dividing it into two substantially equal amplitude portions guided in physically separated waveguides, reflecting said portions respectively in positively and negatively monotonically chirped Bragg gratings, and recombining said portions after said reflection, the Bragg gratings being disposed such that, at a specific wavelength of the FM signal, the effective optical path distance travelled by each component from the physical separation of the components to their recombination is the same for both components.

2. A method as claimed in claim 1, wherein said reflection of said portions is reflection in oppositely directed Bragg gratings that are substantially identical.

3. An FM to AM converter comprising a 3 dB 2×2 optical waveguide splitter/combiner having first and second ports optically coupled with third and fourth ports via an optical coupling region, wherein the third and fourth ports are optically coupled with first and second spectrally selective reflectors respectively constituted by positively and negatively monotonically chirped Bragg gratings positioned such that light of a specific wavelength is reflected by the first and second gratings at equal effective path distances from the coupling region.

4. A converter as claimed in claim 3, wherein the Bragg gratings are substantially identical.

5. A method of stabilising the emission wavelength of an injection laser using a feedback control loop in which a portion of the laser emission is directed to a photodetector after having been divided into two substantially equal amplitude components that are recombined after reflection in oppositely directed positively and negatively monotonically chirped Bragg gratings formed in two waveguides and disposed such that, at a wavelength within the emission waveband of the laser, the optical path distances travelled by each component from their division to their recombination is the same for both components.

6. A method as claimed in claim 5, wherein said reflection is reflection in oppositely directed Bragg gratings that are substantially identical.

7. An emission wavelength stabilised injection laser provided with an emission wavelength stabilising feedback control loop in which a photodetector is optically coupled with the laser via an optical waveguide format Michelson interferometer constituted by a 2×2 3 dB beam splitter/combiner and two oppositely directed monotonically chirped Bragg grating wavelength selective reflectors disposed such that at a wavelength within the emission band of the laser the two interference arms of the Michelson interferometer have equal effective optical path lengths.

8. An emission stabilised injection laser as claimed in claim 7, wherein the two Bragg grating reflectors are substantially identical.

* * * * *